United States Patent
Pedicini et al.

(10) Patent No.: US 11,526,724 B2
(45) Date of Patent: Dec. 13, 2022

(54) VIRTUAL SENSOR FOR ESTIMATING ONLINE UNMEASURABLE VARIABLES VIA SUCCESSIVE TIME DERIVATIVES

(71) Applicant: GM GLOBAL TECHNOLOGY OPERATIONS LLC, Detroit, MI (US)

(72) Inventors: Carmen Pedicini, Turin (IT); Corrado Possieri, Monte Porzio Catone (IT); Vincenzo Alfieri, Turin (IT); Giuseppe Conte, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 718 days.

(21) Appl. No.: 16/546,887

(22) Filed: Aug. 21, 2019

(65) Prior Publication Data
US 2021/0056377 A1    Feb. 25, 2021

(51) Int. Cl.
| | | |
|---|---|---|
| *G06N 3/04* | (2006.01) | |
| *G06N 3/08* | (2006.01) | |
| *G07C 5/08* | (2006.01) | |
| *G06F 17/16* | (2006.01) | |

(Continued)

(52) U.S. Cl.
CPC ............ *G06N 3/04* (2013.01); *G05B 13/027* (2013.01); *G05D 1/0088* (2013.01); *G06F 17/16* (2013.01); *G06N 3/08* (2013.01); *G07C 5/085* (2013.01); *G05D 2201/0213* (2013.01)

(58) Field of Classification Search
CPC .......... G06N 3/04; G06N 3/08; G06N 3/0454; G05B 13/027; G05D 1/0088; G05D 2201/0213; G07C 5/085; B60W 40/00; B60W 2050/0008; B60W 2050/0012; G06F 30/27
See application file for complete search history.

(56) References Cited

U.S. PATENT DOCUMENTS

| | | | | |
|---|---|---|---|---|
| 6,236,908 B1 * | 5/2001 | Cheng | ................. | F02D 41/0062 701/1 |
| 8,793,004 B2 * | 7/2014 | Grichnik | ................ | G05B 17/02 700/47 |

FOREIGN PATENT DOCUMENTS

CN      109189103 A  *  1/2019   ......... F02D 41/0062

OTHER PUBLICATIONS

Zweiri et al.; Diesel Engine Indicated Torque Estimation Based on Artificial Neural Networks; 2007 IEEE/ACS Intl. Conf. on Computer Systems and Applications; pp. 791-798 (Year: 2007).*

(Continued)

*Primary Examiner* — Michael J Zanelli
(74) *Attorney, Agent, or Firm* — Lorenz & Kopf, LLP

(57) ABSTRACT

Provided is a processor-implemented method and a processor in a vehicle for estimating the value of a quantity for which a physical sensor is not available for measurement. The method includes: receiving a plurality of measured signals representing values of measurable variables; computing, in real-time, time derivatives of the measured signals; and applying a trained feedforward neural network, in real-time, to estimate values for a plurality of unmeasurable variables, the unmeasurable variables being variables that are unmeasurable in real-time, the feedforward neural network having been trained using test data containing time derivatives of values for the measurable variables and values for the unmeasurable variables; wherein the vehicle uses the estimated values for the unmeasurable variables for vehicle operation.

17 Claims, 4 Drawing Sheets

(51) Int. Cl.
    *G05D 1/00*     (2006.01)
    *G05B 13/02*     (2006.01)

(56) References Cited

OTHER PUBLICATIONS

Lerro et al.; Survey on a Neural Network for Non Linear Estimation of Aerodynamic Angles; 2017 Intelligent Systems Conf. (IntelliSys); pp. 929-935 (Year: 2017).*

Prokhorov; Virtual Sensors and Their Automotive Applications; 2005 Intl. Conf. on Intelligent Sensors, Sensor Networks and Information Processing; pp. 411-416 (Year: 2005).*

* cited by examiner

VIRTUAL SENSOR FOR ESTIMATING ONLINE UNMEASURABLE VARIABLES VIA SUCCESSIVE TIME DERIVATIVES

TECHNICAL FIELD

The present disclosure relates generally to system and methods in a vehicle for estimating the value of unmeasured quantities and more particularly to system and methods in a vehicle for estimating the value of unmeasured quantities based on the value of measured quantities.

Modern vehicles are equipped with many sensors to measure the value of various quantities during vehicle operation. The quantities may include various temperatures, pressures, voltage levels and others. The measurements may be used, in real-time (e.g., while the vehicle is operating), to affect vehicle operation, determine vehicle health and operational capabilities, and for other vehicle uses. There are some quantities that may not be measurable in real-time, for example, due to a physical sensor not being provided or available during vehicle operation for measurement. Knowledge of the unmeasured quantities, however, may provide improved functional capabilities for the vehicle.

Accordingly, it is desirable to provide systems and methods for determining, in real-time, the value of quantities that are not measurable in real-time by a physical sensor. Furthermore, other desirable features and characteristics of the present invention will become apparent from the subsequent detailed description of the invention and the appended claims, taken in conjunction with the accompanying drawings and the background of the invention.

SUMMARY

Systems and methods are provided for estimating, in real-time, the values of quantities in a vehicle that are not measured. In one embodiment, provided is a processor-implemented method in a vehicle for estimating the value of a quantity for which a physical sensor is not available for measurement. The method includes: receiving a plurality of measured signals representing values of measurable variables; computing, in real-time, time derivatives of the measured signals; and applying a trained feedforward neural network, in real-time, to estimate values for a plurality of unmeasurable variables, the unmeasurable variables being variables that are unmeasurable in real-time, the feedforward neural network having been trained using test data containing time derivatives of values for the measurable variables and values for the unmeasurable variables; wherein the vehicle uses the estimated values for the measurable and unmeasurable variables for vehicle operation.

In one embodiment, the computing the time derivatives of the measured signals may include applying a model-free derivatives estimator to compute the time derivatives.

In one embodiment, the trained feedforward neural network was trained using a process including: collecting test data that includes values for the unmeasurable variables and corresponding values for the measurable variables; estimating successive time derivatives of the values for the measured variables; and training the feedforward neural network to find a mathematical model that correlates the time derivatives for the measured values to the values attained by the unmeasurable variables.

In one embodiment, the estimating successive time derivatives of the values for the measured variables may be implemented using a model-free derivatives estimator.

In one embodiment, the model-free derivatives estimator may include a high-gain observer, a sliding mode observer or a super-twisting algorithm.

In one embodiment, the derivative estimator may be represented by the following discrete time system: $\xi(k+1)=E\xi(k)+Fv(k)$, $\psi(k)=G\xi(k)+Hv(k)$, wherein $\xi$ is a state vector, v is a vector of the measured variables, and is the vector of time derivatives of v.

In one embodiment, E, F, G, and H are matrices computed using a Forward Euler method, a Backward Euler method, or a Tustin method.

In another embodiment, a processor configured as a virtual sensor in a vehicle to estimate a quantity for which a physical sensor is not available for measurement. The processor is configured to: receive a plurality of measured signals representing values of measurable variables; compute, in real-time, time derivatives of the measured signals; and apply a trained feedforward neural network, in real-time, to estimate values for a plurality of unmeasurable variables, the unmeasurable variables being variables that are unmeasurable in real-time, the feedforward neural network having been trained using test data containing time derivatives of values for the measurable variables and values for the unmeasurable variables; wherein the vehicle uses the estimated values for the unmeasurable variables for vehicle operation.

In one embodiment, the processor may be configured to compute the time derivatives of the measured signals by applying a model-free derivatives estimator to compute the time derivatives.

In one embodiment, the trained feedforward neural network was trained using a process including: collecting test data that includes values for the unmeasurable variables and corresponding values for the measurable variables; estimating successive time derivatives of the values for the measured variables; and training the feedforward neural network to find a mathematical model that correlates the time derivatives for the measured values to the values attained by the unmeasurable variables.

In one embodiment, the estimating successive time derivatives of the values for the measured variables may be implemented using a model-free derivatives estimator.

In one embodiment, the virtual sensor, wherein the model-free derivatives estimator may include a high-gain observer, a sliding mode observer or a super-twisting algorithm.

In one embodiment, the derivative estimator may be represented by the following discrete time system: $\xi(k+1)=E\xi(k)+Fv(k)$, $\psi((k)=G\xi(k)+Hv(k)$, wherein $\xi$ is a state vector, v is a vector of the measured variables, and is the vector of time derivatives of v.

In one embodiment, E, F, G, and H are matrices computed using a Forward Euler method, a Backward Euler method, or a Tustin method.

In another embodiment, a non-transitory computer readable storage medium embodying programming instruction for performing a method in a vehicle is provided. The method includes: receiving a plurality of measured signals representing values of measurable variables; computing, in real-time, time derivatives of the measured signals; and applying a trained feedforward neural network, in real-time, to estimate values for a plurality of unmeasurable variables, the unmeasurable variables being variables that are unmeasurable in real-time, the feedforward neural network having been trained using test data containing time derivatives of values for the measurable variables and values for the unmeasurable variables; wherein the vehicle uses the estimated values for the unmeasurable variables for vehicle operation.

In one embodiment, the computing the time derivatives of the measured signals may include applying a model-free derivatives estimator to compute the time derivatives.

In one embodiment, the trained feedforward neural network was trained using a process including: collecting test data that includes values for the unmeasurable variables and corresponding values for the measurable variables; estimating successive time derivatives of the values for the measured variables; and training the feedforward neural network to find a mathematical model that correlates the time derivatives for the measured values to the values attained by the unmeasurable variables.

In one embodiment, the estimating successive time derivatives of the values for the measured variables may be implemented using a model-free derivatives estimator.

In one embodiment, the model-free derivatives estimator may include a high-gain observer, a sliding mode observer or a super-twisting algorithm.

In one embodiment, the derivative estimator may be represented by the following discrete time system: $\xi(k+1)=E\xi(k)+Fv(k)$, $\psi(k)=G\xi(k)+Hv(k)$, wherein $\xi$ is a state vector, v is a vector of the measured variables, and is the vector of time derivatives of v; and E, F, G, and H are matrices computed using a Forward Euler method, a Backward Euler method, or a Tustin method.

BRIEF DESCRIPTION OF THE DRAWINGS

Aspects of the present disclosure are best understood from the following detailed description when read with the accompanying figures, wherein like numerals denote like elements.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, neural networks, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Consider a plant whose dynamics are given by $$\dot{x}(t)=f(x(t),u(t)), y(t)=h(x(t),u(t)),$$

where x is the state of the plant, u is its input and y is its output. By classical results regarding observability of dynamical systems, the current state x of the plant can be reconstructed from the knowledge of the input u and of the output y if and only if there exist a positive integer k and a map $K(\cdot)$ such that $$x(t) = K\left(y(t), \frac{d}{dt}y(t), \ldots, \frac{d^k}{dt^k}y(t), u(t), \frac{d}{dt}u(t), \ldots, \frac{d^k}{dt^k}u(t)\right).$$

Based on the foregoing, a virtual sensor has been proposed for estimating unmeasurable physical quantities in a vehicle by calculating the value of x(t) from the foregoing equation for each unmeasurable quantity. The proposed virtual sensor estimates the time derivatives $$y(t), \frac{d}{dt}y(t), \ldots, \frac{d^k}{dt^k}y(t), u(t), \frac{d}{dt}u(t), \ldots, \frac{d^k}{dt^k}u(t)$$

by using a derivative estimator and estimates the map $K(\cdot)$ by using a trained feedforward artificial neural network.

Figure 1:
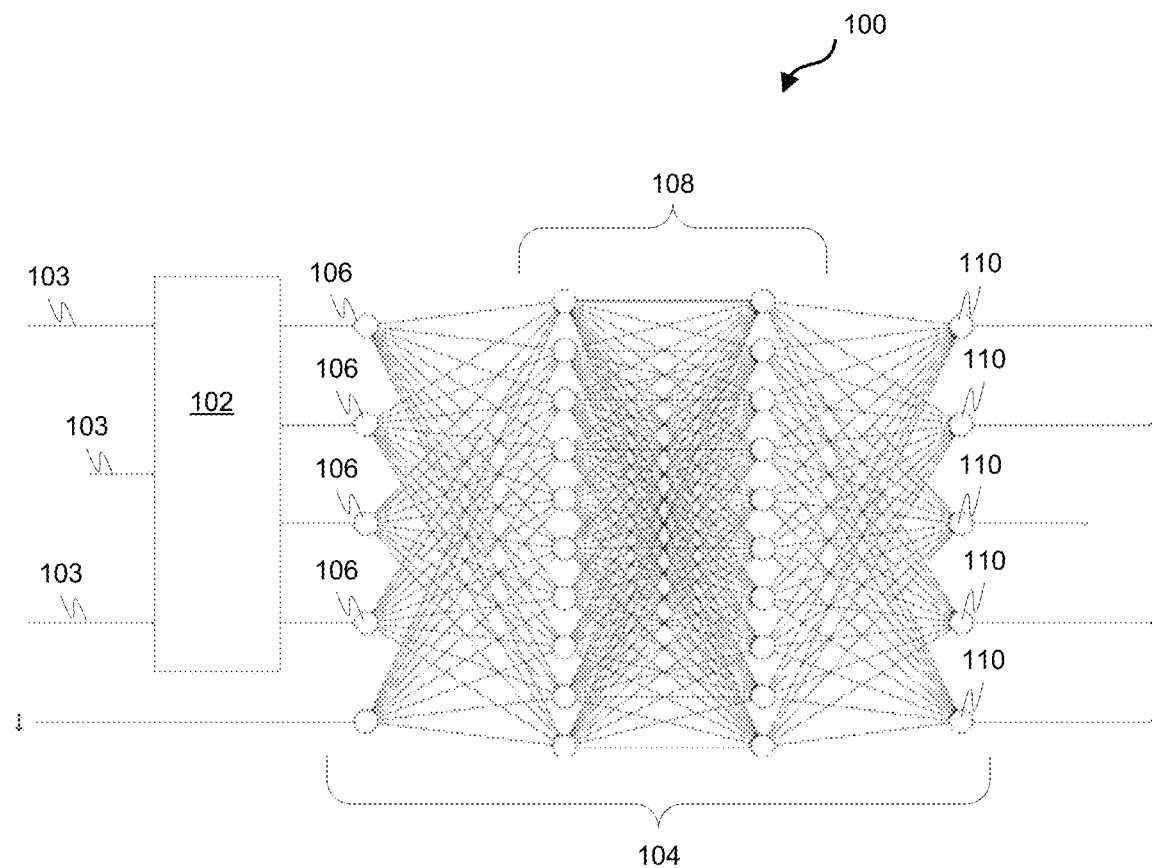
FIG. 1 is a block diagram depicting an example virtual sensor in an example vehicle for estimating unmeasurable quantities, in accordance with some embodiments.

FIG. 1 is a block diagram depicting an example virtual sensor 100 in an example vehicle for estimating unmeasurable quantities. The example virtual sensor 100 is implemented by one or more processors configured by programming instructions encoded on non-transient computer readable media. The example virtual sensor 100 is configured to estimate unmeasurable physical quantities relying on the available data and successive time derivatives of measured variables.

The example virtual sensor 100 performs the estimation by using a derivatives estimator 102 and a feedforward artificial neural network (F-ANN) 104. The example derivatives estimator 102 and F-ANN 104 are implemented, in this example, via the one or more processors configured by programming instructions. The example derivatives estimator 102 is configured to receive values 103 of measurable variables, compute derivatives for the values of the measurable variables, and provide the derivatives to the feedforward neural network 104 at input nodes 106.

The example derivatives estimator 102 may be generated using the following mathematical operations. Pick positive real numbers $r_1, \ldots, r_k$ and compute the polynomial $$p=(s+r_1)(s+r_2)\ldots(s+r_k)=s^k+g_1 s^{k-1}+g_2 s^{k-2}+\ldots+g_{k-1}s+g_k.$$

Fix a small $\epsilon>0$ and define the matrices $$A = \begin{bmatrix} -\frac{g_1}{\epsilon} & 1 & \cdots & 0 \\ \vdots & 0 & \ddots & 0 \\ -\frac{g_{k-1}}{\epsilon^{k-1}} & 0 & \cdots & 1 \\ -\frac{g_k}{\epsilon^k} & 0 & \cdots & 0 \end{bmatrix}, B = \begin{bmatrix} -\frac{g_1}{\epsilon} \\ \vdots \\ -\frac{g_{k-1}}{\epsilon^{k-1}} \\ -\frac{g_k}{\epsilon^k} \end{bmatrix}.$$

Let $\oplus$ denote the direct sum; hence, letting m be the number of inputs, define $$R = \bigoplus_{i=1}^{m} A, \; L = \bigoplus_{i=1}^{m} B,$$

Different estimators can be used to design the derivative estimator 102 to estimate the time derivative of the available measurements, such as high-gain observers, sliding mode observers, and super-twisting algorithms. The example presented above is just one example.

Letting T denote the sampling time and letting I denote the identity matrix of suitable dimensions, use one of the following methods to compute the matrices E, F, G, and H.

| Method | E | F | G | H |
| --- | --- | --- | --- | --- |
| Forward Euler | $I + TR$ | $TL$ | $I$ | $0$ |
| Backward Euler | $(I - TR)^{-1}$ | $(I - TR)^{-1} LT$ | $(I - TR)^{-1}$ | $(I - TR)^{-1} LT$ |
| Tustin | $\left(I+\frac{T}{R}R\right)\left(I-\frac{T}{2}R\right)^{-1}$ | $\left(I-\frac{T}{2}R\right)^{-1} L\sqrt{T}$ | $\sqrt{T}\left(I-\frac{T}{2}R\right)^{-1}$ | $\left(I-\frac{T}{2}R\right)^{-1} L\frac{T}{2}$ |

The derivative estimator is given by the following discrete-time system $$\xi(k+1)=E\xi(k)+Fv(k),$$

$$\psi(k)=G\xi(k)+Hv(k),$$

where v is the vector of measured variables and $\psi$ their time derivatives.

The example F-ANN 104 includes input nodes 106 for receiving the output (derivatives) from the derivative estimator 102, a plurality of hidden layers/nodes 108 which are trained to model a system to estimate the unmeasurable variables, and a plurality of output nodes 110. The output nodes provide the estimates for unmeasurable variables.

The example F-ANN 104 may be trained using the following operations. By using a test bench or a simulator, collect ordered samples of the physical variables that can be measured in real-time (in the following, denoted $v^{(i)}$) and of the ones that have to be estimated (in the following, denoted $z^{(i)}$), so obtaining the dataset $$D\{(v^{(1)},z^{(1)}),\ldots,(v^{(N)},z^{(N)})\}.$$

Apply the derivative estimator to the ordered sequence of measurable variables $$\{v^{(1)},\ldots,v^{(N)}\}$$

thus obtaining the sequence of their time derivatives:
$\{\psi^{(1)},\ldots,\psi^{(N)}\}$.

Train a feedforward neural network by using (possibly, a subset of) the dataset $$Q\{(\psi^{(1)},z^{(1)}),\ldots,(\psi^{(N)},z^{(N)})\}.$$

Let $\Phi(\psi)$ be the input output function synthesized by the neural network. The neural network can be trained and designed by using state-of-the-art tools and algorithms, and its complexity (number of layers, number on neurons in each layer, activation functions) can be chosen using cross validation.

The example virtual sensor 100 may be represented using the following mathematical representations. Mathematically, the data-driven virtual sensor 100 for the unmeasurable variables can be represented by the following discrete-time dynamical system:

$$\xi(k+1)=E\xi(k)+Fv(k),\psi(k)=G\xi(k)+Hv(k),z(k)=\Phi(\psi(k)).$$

In particular, the vector z(k) is an estimate of the variables that cannot be directly measured during normal functioning.

Benefits of the virtual sensor 100 may include: obtaining very accurate estimates of physical variables that are unmeasurable during normal functioning; estimating, in real-time, unmeasurable dynamic variables by relying on data and available measurements; no requirement for a dynamic model and observer for estimating values for unmeasurable variables; simplified neural network training—the training of the feedforward neural network is simpler than one required by other techniques such as techniques for training recurrent neural networks and set membership tools because a memoryless network is used (e.g., an ANN w/memory and/or time-delay is not needed); low online computational complexity for the neural network; parameters can be easily designed to meet accuracy requirements; the dynamics of the process are mimicked by the derivative estimator; and sensor-less estimation of physical quantities that cannot be measured in real-time (e.g., no sensor may be available or a sensor may no longer be usable) with high accuracy and reduced computational cost.

Other benefits may include: the virtual sensor 100 may be designed without any prior knowledge about the system that is being analyzed and without requiring expensive measurements of its parameters. A dynamic model and observer design to reconstruct the signal dynamics is not needed. In contrast to state observers (such as Kalman Filters, High-Gain or Sliding Mode observers), the example virtual sensor 100 does not require a physical model of the system (model-free method). Usage of a derivative estimator and a feedforward neural network allows one to take into account also the dynamics of the process being observed (e.g., the dynamics of an internal combustion engine) with very low computational, complexity and calibration effort request.

Figure 2:
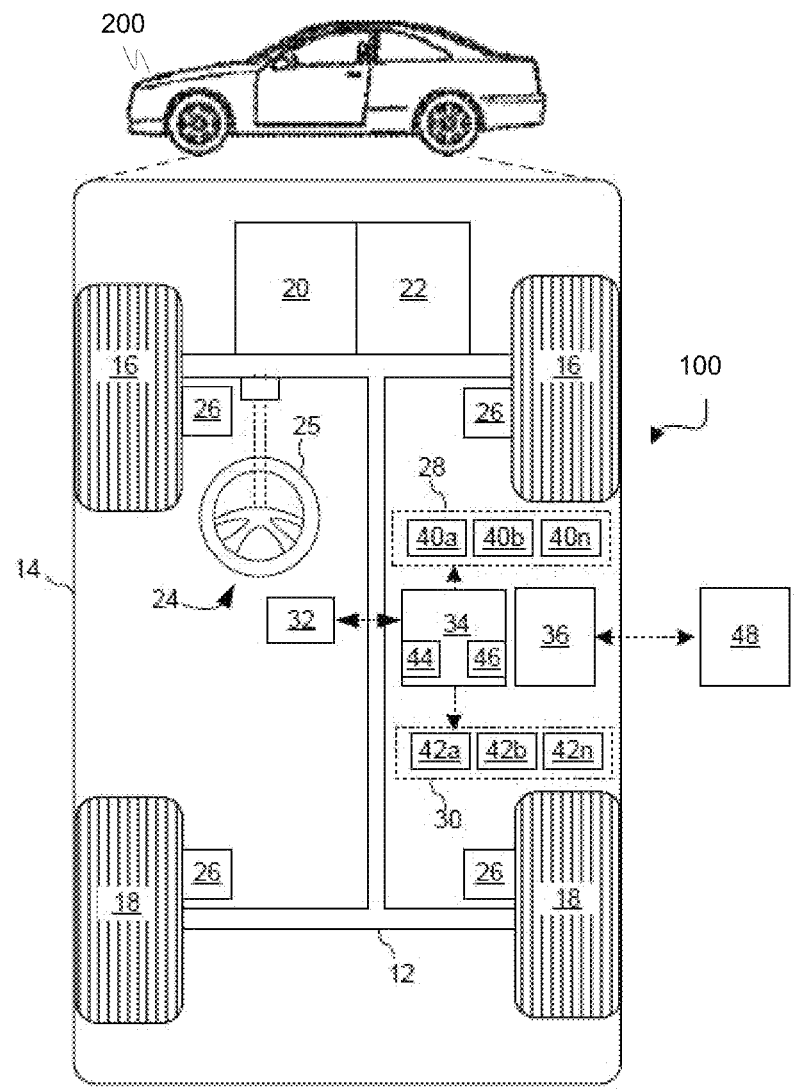
FIG. 2 is a block diagram of an example vehicle that can employ a virtual sensor to measure quantities, such as voltages, temperatures, pressures, etc., when no sensor is available for measurement, in accordance with some embodiments.

FIG. 2 is a block diagram of an example vehicle 200 that can employ a virtual sensor 100 to measure quantities, such as voltages, temperatures, pressures, etc., when no sensor is available for measurement (e.g., no sensor provided, a sensor fails, or a sensor is taken offline). The vehicle 200 generally includes a chassis 12, a body 14, front wheels 16, and rear wheels 18. The body 14 is arranged on the chassis 12 and substantially encloses components of the vehicle 200. The body 14 and the chassis 12 may jointly form a frame. The wheels 16-18 are each rotationally coupled to the chassis 12 near a respective corner of the body 14. The vehicle 200 is depicted in the illustrated embodiment as a passenger car, but other vehicle types, including motorcycles, trucks, sport utility vehicles (SUVs), recreational vehicles (RVs), marine vessels, aircraft, etc., may also be used. The vehicle 200 may be capable of being driven autonomously or semi-autonomously.

The vehicle 200 further includes a propulsion system 20, a transmission system 22, a steering system 24, a brake system 26, a sensor system 28, an actuator system 30, at least one data storage device 32, at least one controller 34, and a communication system 36 that is configured to wirelessly communicate information to and from other entities 48.

The data storage device 32 stores data for use in automatically controlling the vehicle 200. The data storage device 32 may be part of the controller 34, separate from the controller 34, or part of the controller 34 and part of a separate system. The controller 34 includes at least one processor 44 and a computer-readable storage device or media 46. In various embodiments, controller 34 implements an enhancement controller 103 for predicting transfer-of-control events and determining mitigating and/or enhancement actions for mitigating/enhancing the likelihood of the predicted transfer-of-control event occurring. Although only one controller 34 is shown in FIG. 1, embodiments of the vehicle 200 may include any number of controllers 34 that communicate over any suitable communication medium or a combination of communication mediums and that cooperate to process the sensor signals, perform logic, calculations, methods, and/or algorithms, and generate control signals to automatically control features of the vehicle 200. The controller 34 may be configured to implement the virtual sensor 100.

The controller 34 includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and non-volatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller. The programming instructions may include one or more separate programs, each of which comprises an ordered listing of executable instructions for implementing logical functions.

Figure 3A:
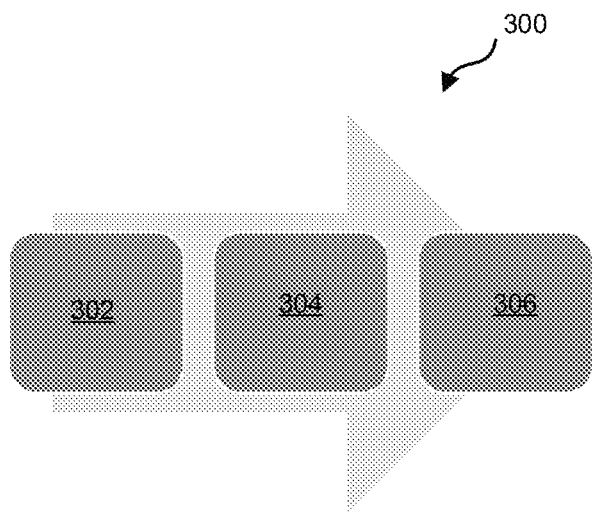
FIG. 3A is a process flow chart depicting an example process for training an example virtual sensor, in accordance with some embodiments.

FIG. 3A is a process flow chart depicting an example process 300 for training an example virtual sensor 100. The training may be performed using the following three operation. First, data for the variables that have to be estimated in real-time and for the corresponding variables that are measured are collected (operation 302). Next, a model-free derivatives estimator (e.g., High-Gain observer, Sliding Mode observer, etc.) is for estimating successive time derivatives of the measured variables (operation 304). Third, a feedforward neural network is trained to find a mathematical model relating to the time derivatives of the measured signals and the values attained by the variables to be estimated.

Figure 3B:
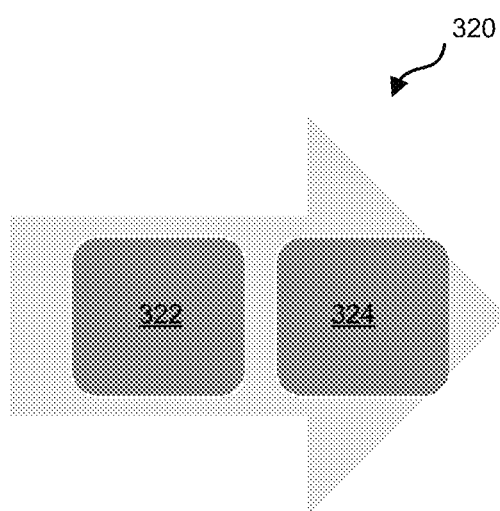
FIG. 3B is a process flow chart depicting an example process for use of an example virtual sensor, in accordance with some embodiments.

FIG. 3B is a process flow chart depicting an example process 320 for use of an example virtual sensor 100. First, the time derivatives of measured signals are computed using a model-free derivative estimator (operation 322). Next, the trained neural network is used to estimate, based on the computed time derivatives, the current values of the unmeasured variables.

Figure 4:
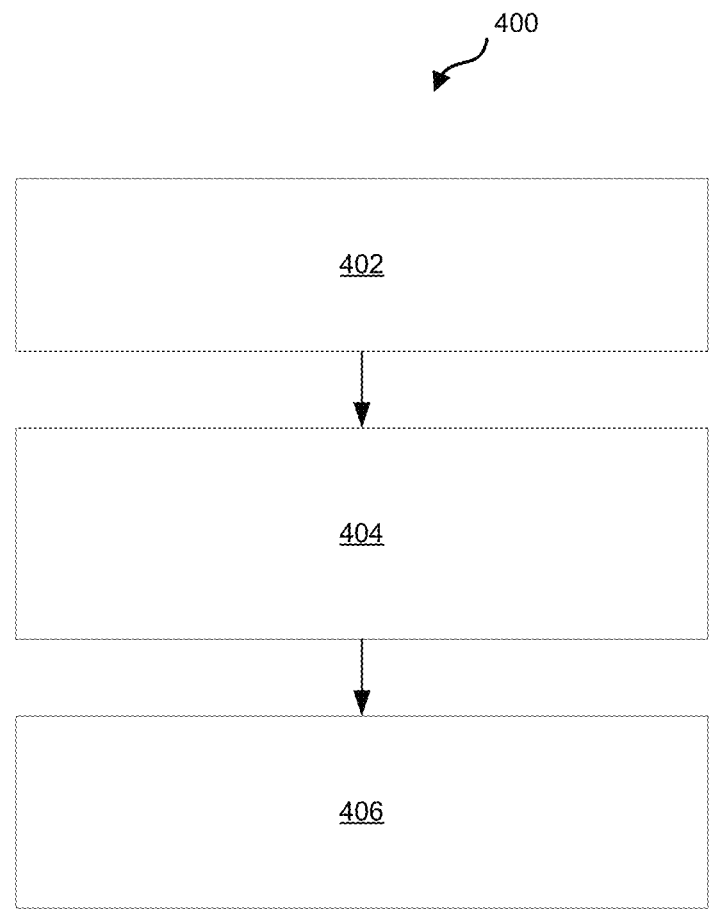
FIG. 4 is a process flow chart depicting an example process in a vehicle for estimating an unmeasured quantity, in accordance with some embodiments.

FIG. 4 is a process flow chart depicting an example process in a vehicle for estimating an unmeasured quantity. The order of operation within process 400 is not limited to the sequential execution as illustrated in the FIG. 4 but may be performed in one or more varying orders as applicable and in accordance with the present disclosure.

The example process 400 includes receiving a plurality of measured signals representing values of measurable variables (operation 402) and computing, in real-time, the time derivatives of the measured signals (operation 404). The computing the time derivatives of the measured signals may include applying a model-free derivatives estimator to compute the time derivatives. The model-free derivatives estimator is derived without any knowledge of a model of the system for which the derivatives estimator is to be used.

The example process 400 includes applying a trained feedforward neural network, in real-time, to estimate values for a plurality of unmeasurable variables (operation 406). The feedforward neural network has been trained using test data containing derivatives for the measurable variables and values for the unmeasurable variables. The trained feedforward neural network can be trained without any knowledge of a model of the system for which the trained feedforward neural network is to be used to estimate. The trained feedforward neural network can be trained using a process comprising: collecting test data that includes values for the unmeasurable variables and corresponding values for the measurable variables; estimating successive time derivatives of the values for the measured variables; and training the feedforward neural network to find a mathematical model that correlates the time derivatives for the measured values to the values attained by the unmeasurable variables. The estimating successive time derivatives of the measured variables can be implemented using a model-free derivatives estimator. The model-free derivatives estimator may comprise a High-Gain observer, a sliding mode observer or a super-twisting algorithm. The derivative estimator may be represented by the following discrete time system: $\xi(k+1) = E\xi(k) + Fv(k)$, $\psi(k) = G\xi(k) + Hv(k)$, wherein $\xi$ is a state vector, v is a vector of the measured variables, and is the vector of time derivatives of v. E, F, G, and H are matrices computed using a Forward Euler method, a Backward Euler method, or a Tustin method.

The described systems, methods, apparatus, and techniques provide for usage of successive time derivatives of measured signals as an enabler for designing a simplified virtual sensor capable of estimating unmeasurable variables. The successive time derivatives allows one to take into account the dynamics of the system without having its dynamic model (model-free method). An advantage of the described systems, methods, apparatus, and techniques is its simplicity (lower complexity and computational cost), its versatility and flexibility, and its very high accuracy in any industrial applications with limited online computational power. The described systems, methods, apparatus, and techniques provide a method for reconstructing actual unmeasurable signals in a very effective and efficient way. The described systems, methods, apparatus, and techniques employ successive time derivatives of the measured signals in a simplified virtual sensor design (using simple static black-box models such as feedforward neural networks) to take into account the system dynamics.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A processor-implemented method in a vehicle for estimating a quantity for which a physical sensor is not available to measure the quantity, the method comprising:
   receiving a plurality of measured signals representing values of measurable variables;
   computing, in real-time, time derivatives of the measured signals by applying a model-free derivatives estimator to compute the time derivatives; and
   applying a trained feedforward neural network, in real-time, to estimate values for a plurality of unmeasurable variables, the unmeasurable variables being variables that are unmeasurable in real-time, the feedforward neural network having been trained using test data containing time derivatives of values for the measurable variables and values for the unmeasurable variables;
   wherein the vehicle uses the estimated values for the unmeasurable variables for vehicle operation.

2. The method of claim 1, wherein the trained feedforward neural network was trained using a process comprising:
   collecting test data that includes values for the unmeasurable variables and corresponding values for the measurable variables;
   estimating successive time derivatives of the values for the measured variables; and
   training the feedforward neural network to find a mathematical model that correlates the time derivatives for the measured values to the values attained by the unmeasurable variables.

3. The method of claim 2, wherein the estimating successive time derivatives of the values for the measured variables is implemented using a model-free derivatives estimator.

4. The method of claim 1, wherein the model-free derivatives estimator comprises a high-gain observer, a sliding mode observer or a super-twisting algorithm.

5. The method of claim 1, wherein the model-free derivatives estimator is represented by the following discrete time system: $\xi(k+1)=E\xi(k)+Fv(k)$, $\psi(k)=G\xi(k)+Hv(k)$, wherein $\xi$ is a state vector, v is a vector of the measured variables, and $\psi$ is the vector of time derivatives of v.

6. The method of claim 5, wherein E, F, G, and H are matrices computed using a Forward Euler method, a Backward Euler method, or a Tustin method.

7. A processor configured as a virtual sensor in a vehicle to estimate a quantity for which a physical sensor is not available for measurement, the processor configured to:
   receive a plurality of measured signals representing values of measurable variables;
   compute, in real-time, time derivatives of the measured signals by applying a model-free derivatives estimator to compute the time derivatives; and
   apply a trained feedforward neural network, in real-time, to estimate values for a plurality of unmeasurable variables, the unmeasurable variables being variables that are unmeasurable in real-time, the feedforward neural network having been trained using test data containing time derivatives of values for the measurable variables and values for the unmeasurable variables;
   wherein the vehicle uses the estimated values for the unmeasurable variables for vehicle operation.

8. The processor of claim 7, wherein the trained feedforward neural network was trained using a process comprising:
   collecting test data that includes values for the unmeasurable variables and corresponding values for the measurable variables;
   estimating successive time derivatives of the values for the measured variables; and
   training the feedforward neural network to find a mathematical model that correlates the time derivatives for the measured values to the values attained by the unmeasurable variables.

9. The processor of claim 8, wherein the estimating successive time derivatives of the values for the measured variables is implemented using a model-free derivatives estimator.

10. The processor of claim 7, wherein the model-free derivatives estimator comprises a high-gain observer, a sliding mode observer or a super-twisting algorithm.

11. The processor of claim 7, wherein the model-free derivatives estimator is represented by the following discrete time system: $\xi(k+1)=E\xi(k)+Fv(k)$, $\psi(k)=G\xi(k)+Hv(k)$, wherein $\xi$ is a state vector, v is a vector of the measured variables, and $\psi$ is the vector of time derivatives of v.

12. The processor of claim 11, wherein E, F, G, and H are matrices computed using a Forward Euler method, a Backward Euler method, or a Tustin method.

13. A non-transitory computer readable storage medium embodying programming instruction for performing a method in a vehicle, the method comprising:
   receiving a plurality of measured signals representing values of measurable variables;
   computing, in real-time, time derivatives of the measured signals by applying a model-free derivatives estimator to compute the time derivatives; and
   applying a trained feedforward neural network, in real-time, to estimate values for a plurality of unmeasurable variables, the unmeasurable variables being variables that are unmeasurable in real-time, the feedforward neural network having been trained using test data containing time derivatives of values for the measurable variables and values for the unmeasurable variables;

wherein the vehicle uses the estimated values for the unmeasurable variables for vehicle operation.

14. The non-transitory computer readable storage medium of claim 13, wherein the trained feedforward neural network was trained using a process comprising:
collecting test data that includes values for the unmeasurable variables and corresponding values for the measurable variables;
estimating successive time derivatives of the values for the measured variables; and
training the feedforward neural network to find a mathematical model that correlates the time derivatives for the measured values to the values attained by the unmeasurable variables.

15. The non-transitory computer readable storage medium of claim 14, wherein the estimating successive time derivatives of the measured variables is implemented using a model-free derivatives estimator.

16. The non-transitory computer readable storage medium of claim 13, wherein the model-free derivatives estimator comprises a High-Gain observer, a sliding mode observer or a super-twisting algorithm.

17. The non-transitory computer readable storage medium of claim 13, wherein the model-free derivatives estimator is represented by the following discrete time system: $\xi(k+1)=E\xi(k)+Fv(k)$, $\psi(k)=G\xi(k)+Hv(k)$, wherein:
$\xi$ is a state vector, v is a vector of the measured variables, and $\psi$ is the vector of time derivatives of v; and
E, F, G, and H are matrices computed using a Forward Euler method, a Backward Euler method, or a Tustin method.

* * * * *